(12) United States Patent
Stark

(10) Patent No.: US 9,107,340 B2
(45) Date of Patent: Aug. 18, 2015

(54) DISC FOR AN AGRICULTURAL IMPLEMENT

(75) Inventor: Crister Stark, Väderstad (SE)

(73) Assignee: VADERSTAD-VERKEN AKTEBOLAG, Vaderstad (CH)

( * ) Notice: Subject to any disclaimer, the term of this patent is extended or adjusted under 35 U.S.C. 154(b) by 4 days.

(21) Appl. No.: 13/322,838

(22) PCT Filed: May 27, 2010

(86) PCT No.: PCT/SE2010/050569
§ 371 (c)(1),
(2), (4) Date: Jan. 6, 2012

(87) PCT Pub. No.: WO2010/138068
PCT Pub. Date: Dec. 2, 2010

(65) Prior Publication Data
US 2012/0103642 A1    May 3, 2012

(30) Foreign Application Priority Data

May 29, 2009 (SE) ...................................... 0950391

(51) Int. Cl.
*A01B 15/16* (2006.01)
*A01C 5/06* (2006.01)
*A01B 23/06* (2006.01)

(52) U.S. Cl.
CPC ................. *A01C 5/064* (2013.01); *A01B 15/16* (2013.01); *A01B 23/06* (2013.01)

(58) Field of Classification Search
CPC ...... A01B 23/06; A01B 21/086; A01B 71/04; A01B 15/16; A01C 5/064
USPC .................................................... 172/574, 604
See application file for complete search history.

(56) References Cited

U.S. PATENT DOCUMENTS

| | | | | | |
|---|---|---|---|---|---|
| 337,543 | A | * | 3/1886 | Wonser | 172/454 |
| 358,246 | A | * | 2/1887 | Arnett | 172/604 |
| 442,671 | A | * | 12/1890 | Tower | 280/855 |
| 630,052 | A | * | 8/1899 | Heckman | 172/603 |
| 657,204 | A | * | 9/1900 | Poole | 384/460 |
| 816,543 | A | * | 3/1906 | Erb et al. | 172/558 |

(Continued)

FOREIGN PATENT DOCUMENTS

| | | |
|---|---|---|
| DE | 200 12 666 U1 | 1/2001 |
| EP | 0 914 763 A | 5/1999 |

(Continued)

*Primary Examiner* — Thomas B Will
*Assistant Examiner* — Joel F. Mitchell
(74) *Attorney, Agent, or Firm* — Birch, Stewart, Kolasch & Birch, LLP

(57) ABSTRACT

The invention refers to a disc (8) for an agricultural implement (1) comprising an annular, outside a predetermined center diameter (D) defined, soil-cultivating portion (44), a central, inside a predetermined center diameter (d) defined, dish-shaped portion (43), with a boss-receiving, inner side and between these portions an existing, annular connection portion (45) with fastening screw holes (46). The connection portion (45) is a truncated conical portion, the inner mantle surface of which is mainly straight or double-bowed with the convex side facing said inner side and a line through the opening plane in the hole opening of each fastening screw hole on said inner side forms an angle α with a plane that is perpendicular to the center line of the disc, wherein the angle α is 5°-10°.

20 Claims, 8 Drawing Sheets

(56) References Cited

U.S. PATENT DOCUMENTS

| | | | | |
|---|---|---|---|---|
| 1,663,239 | A | * | 3/1928 | Bucknam .................. 172/604 |
| 2,698,565 | A | * | 1/1955 | Carney ..................... 172/574 |
| 2,746,371 | A | | 5/1956 | Cook |
| 4,016,935 | A | * | 4/1977 | Miller ...................... 172/601 |
| 4,246,971 | A | * | 1/1981 | Johnson ................... 172/535 |
| 6,082,276 | A | | 7/2000 | Klein et al. |

FOREIGN PATENT DOCUMENTS

| | | |
|---|---|---|
| WO | WO 02/19791 A1 | 3/2002 |
| WO | WO 2007/105185 A2 | 9/2007 |

\* cited by examiner

DISC FOR AN AGRICULTURAL IMPLEMENT

The invention refers to a disc for an agricultural implement according to the preamble of Claim 1.

BACKGROUND OF THE INVENTION

It has long been known to use different forms of discs in agricultural implements and often these discs work at an angle in order to till the soil in the desired way. The bearings have often been a weak point, since they are heavily loaded, and in addition they are difficult to build sufficiently impregnable. It is often difficult to manufacture a bearing with sufficient strength and impregnability that is still sufficiently compact. Often the construction height of the bearing viewed in the direction of its central axis has become too great. It has also been shown to be practically difficult to achieve a disc with hub or boss with small axial construction height. The axial extension is therefore often a problem. It is natural for it to be easier to make a sufficiently strong and impregnable bearing if it is allowed to increase in length or height. Furthermore, the discs are subjected to heavy wear and they are therefore commonly made from high-class steel that is hardened and tempered to the best relationship between toughness and hardness. The discs are replaced by the farmer when necessary. Such replacement often takes place in primitive conditions. In continuous production large amounts of discs are assembled and it is desirable for such assembly to be automated. Since the discs are commonly connected against a flat side on the bearing there is no natural orientation of the disc, which can complicate assembly in the field and industrially. Examples of known interfaces are shown in U.S. Pat. No. 2,746,371 and WO02/19791.

AIM OF THE INVENTION

The aim of the invention is to produce a disc for an agricultural implement that in addition to solving the above-mentioned problems also results in an optimal arrangement and gives the greatest user friendliness. The solution also has to be reliable, cost-effective and easy to use.

SUMMARY OF THE INVENTION

The aim has been achieved through a disc according to the characterising part of claim 1.

The sub-claims describe advantageous embodiments of the invention.

An interface between disc and hub or boss, where the disc has a truncated conical, annular portion and the boss is adapted to this portion, gives a natural orientation and some shape-locking of the disc. Through designing an interface in the above way a range of advantages are provided.

Through giving a bearing a conical connection surface the so-called construction height can be decreased, which is illustrated through measurement A in FIG. 5, i.e. the measurement between the inner edge of the disc arm and the abutment point between the flange of the boss and the radially extreme edge of the disc hole. This can be regarded as the construction height in a practical perspective. This A-measurement is critical in certain constructions, for example for certain seed drills. Furthermore it is favourable for the bolt fastening that the centre axis of the screws extends mainly parallel to the centre axis of the boss, since this provides advantages for other equipment in manual or automated production.

An advantage is that through this is achieved a simplification of disc replacement, which is a request from the user's side. Through giving the head of the disc bolts a truncated conical underpart a simple orientation is obtained at assembly, since the bolts are always screwed in parallel to the centre axis of the boss in both automated assembly and in field conditions where the discs are manually replaced as they become worn. Such a construction also gives a certain shape-locking of the disc against the boss, which is necessary since the fastening bolts are subjected to great stresses in work in the field where the soil is often very hard and sometimes also stone-laden. This shape-locking in combination with the design of the bolts decreases the load on the fastening bolts and can provide scope to use three fastening bolts instead of the usual four or five fastening bolts. Three fastening bolts is naturally preferable both with disc replacement in the field and in assembly during production.

DRAWING SUMMARY

The invention is described in more detail in the following with reference to the attached drawings, which shown preferred embodiments.

DETAILED DESCRIPTION OF A PREFERRED EMBODIMENT

Figure 1:
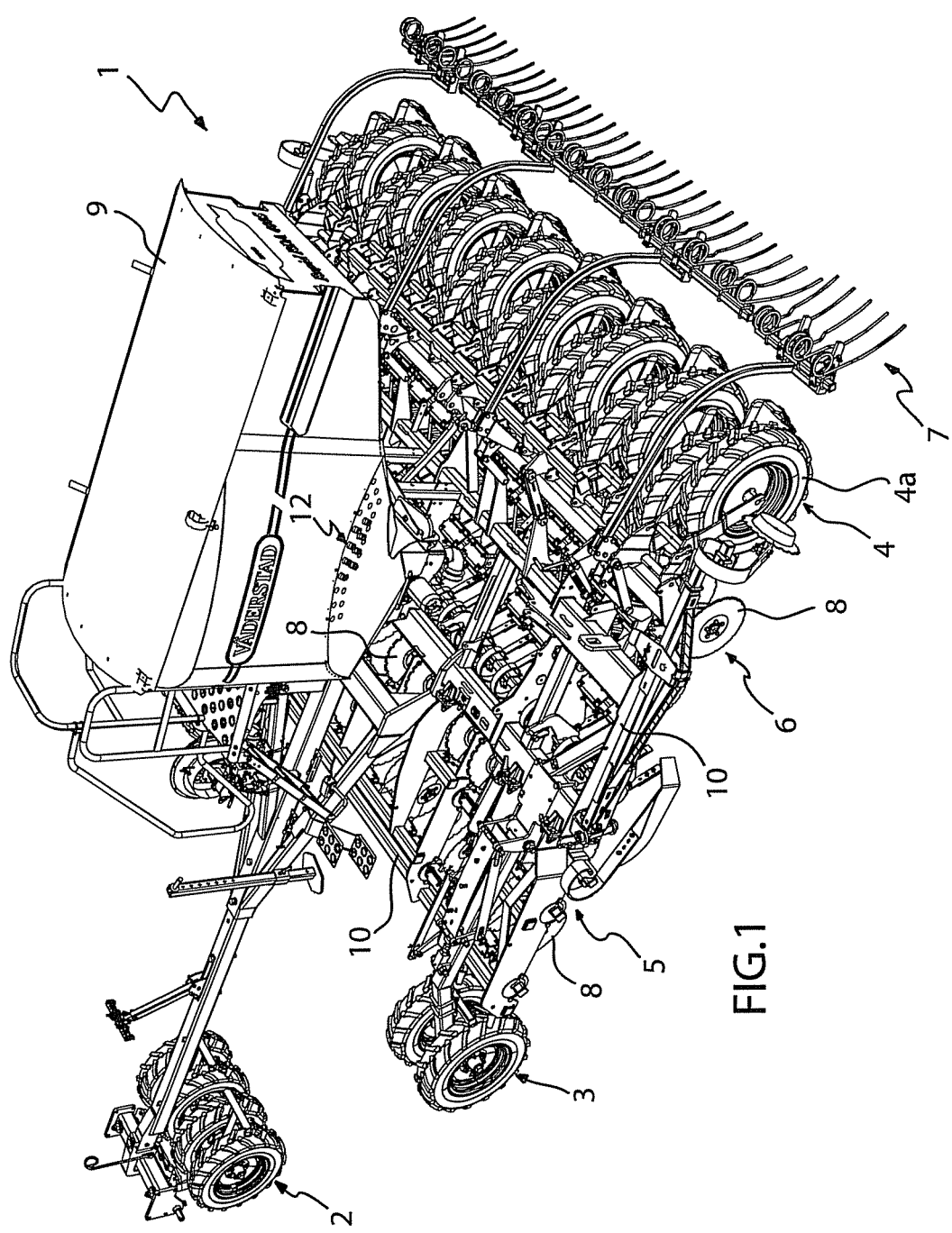
FIG. 1 shows a side view of an agricultural implement, which is provided with soil cultivating discs according to the invention.
Figure 2:
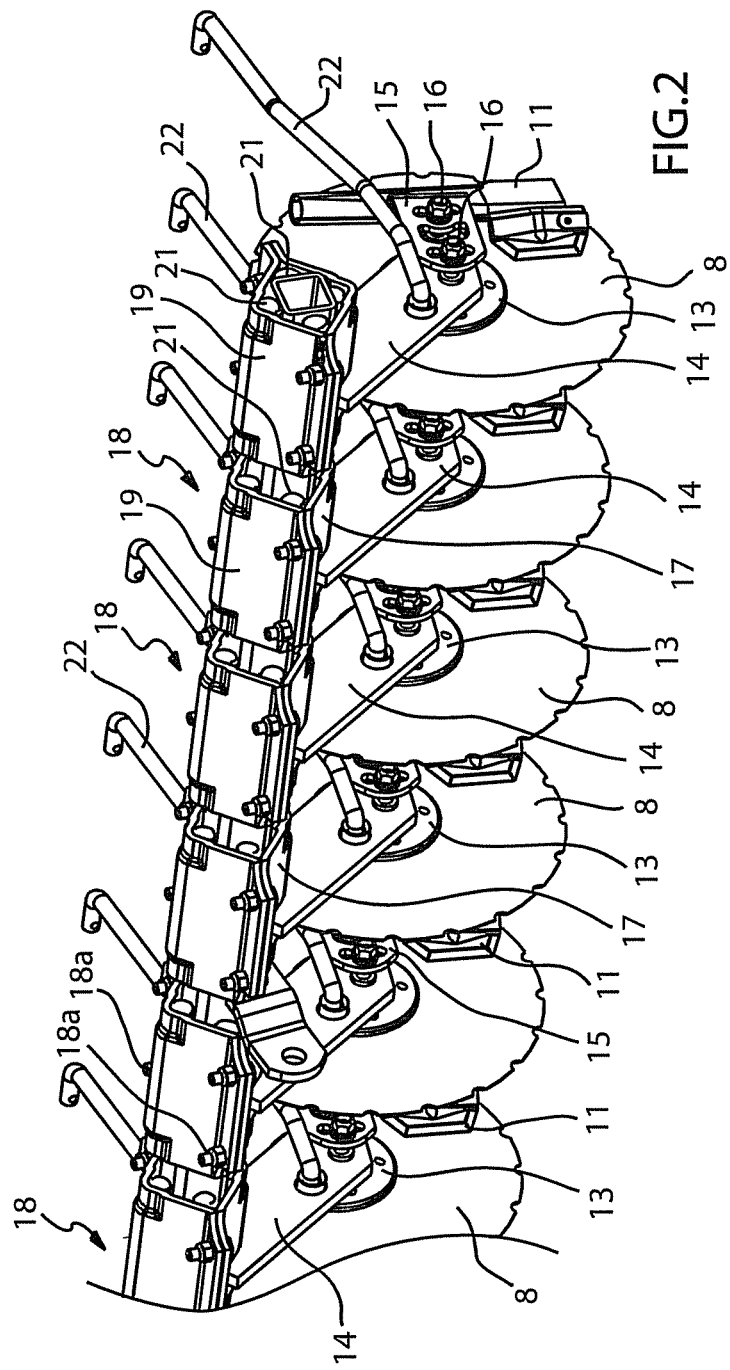
FIG. 2 shows a partial perspective view of a cross-running beam in the agricultural implement in FIG. 1 with a row of assembled disc aggregates with discs according to the invention.
Figure 3:
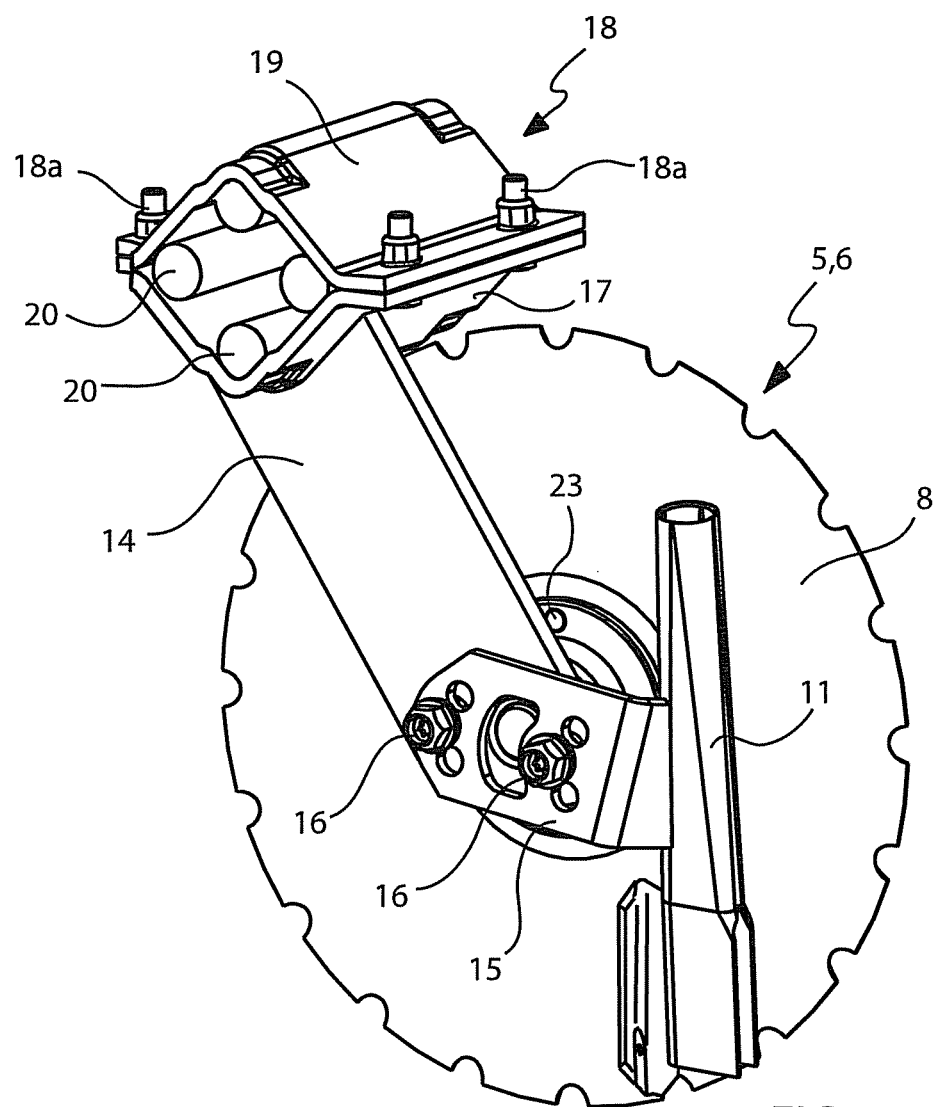
FIG. 3 shows a perspective view of a mainly planar disc according to the invention assembled on a carrying arm with a beam fastening.
Figure 4:
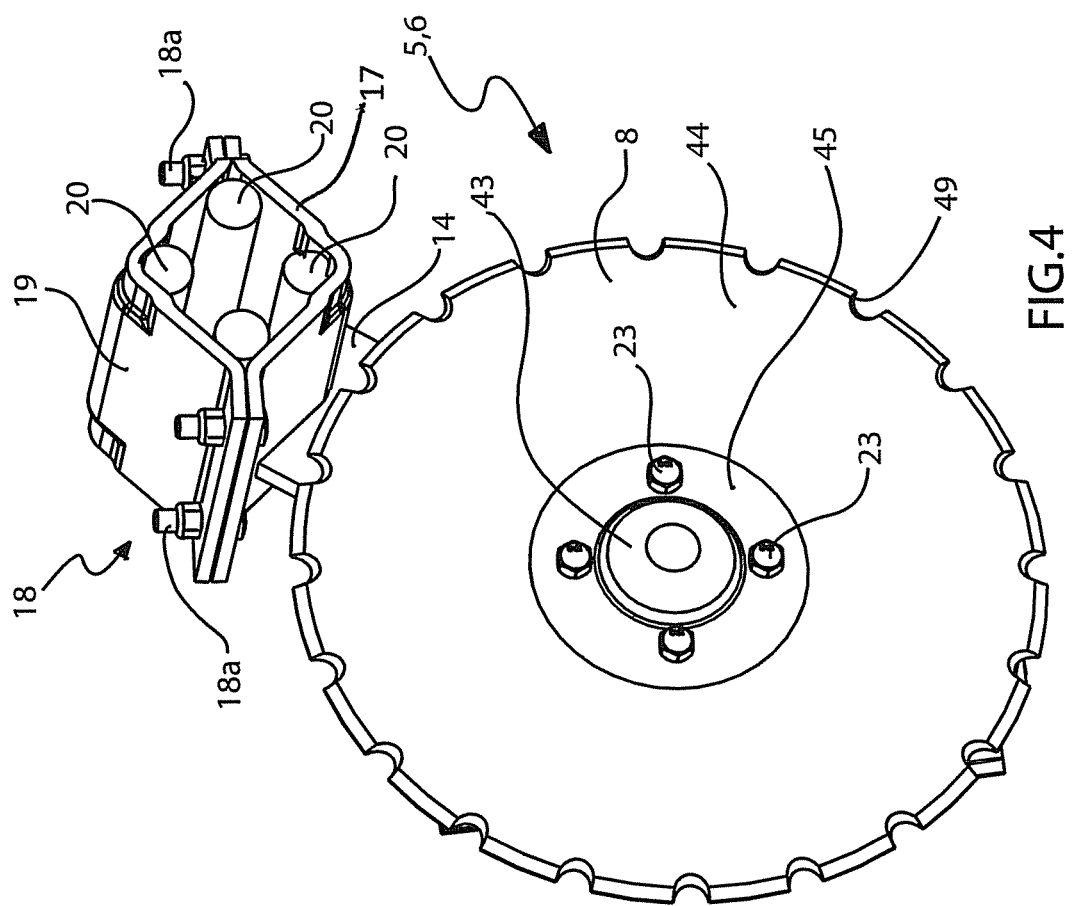
FIG. 4 shows a perspective view from the other side of the disc in FIG. 2.

FIG. 1 shows an agricultural implement 1, which can be drawn by a not shown tractor. Instead of a tractor, the agricultural implement 1 can be propelled forward in other known ways. The agricultural implement 1 is here a seed drill and has wheel groups 2, 3, 4 and is provided with at least two sets of soil cultivating tools in a form including two fore rows of freely rotating disc aggregates 5 for soil cultivation and also incorporation of straw, and two rear rows of rotating disc aggregates 6 for the creation of seed furrows, plus a rear following harrow assemblage 7. Both sets of freely rotating disc aggregates 5, 6 can carry discs 8 according to the invention. The discs in the rows of disc aggregates 5 or 6 can be of different designs. The seed drill shown in FIG. 1 is only an exemplified embodiment for illustrative purposes and does not restrict the use of discs 8 according to the invention. A hopper 9 for seed and/or fertiliser is arranged on the frame 10 of the agricultural implement 1. Via a not shown dosing and transport system seed and/or fertiliser is fed for subsequent metering to seed pipes 11 on the disc 8 (see FIG. 2). Flexible hoses for transport of the seed from the hopper 9 to the seed pipes 11 are omitted for the sake of clarity in FIG. 1 and only indicated at 12. The existing wheel assemblage 4 behind the disc aggregates 5 and 6 is comprised of freely rotatable wheels 4a journalled in bearings, which are adapted to close the furrows opened by the discs 8 after placement of the seed in the soil and then reconsolidate the soil. Wheels 4a in the wheel assemblage 4 are also used as transport wheels for transport of the agricultural implement 1 between fields that are to be cultivated and drilled.

FIGS. 2-8 show as way of example a preferred embodiment of one of the disc aggregates 6 in FIG. 1 for creation of seed furrows and placement of seed. Each disc aggregate 6 comprises a disc 8 according to the invention, which is mounted for free rotation on a hub or a boss 13, which in its turn is mounted on a carrying arm 14 at the disc aggregate 6. A fastening 15 is fixed, preferably by welding, at the seed pipe 11 and is screwed fast by means of two bolt fastenings 16 at the boss 13 on the opposite side of the carrying arm 14 from the disc. The bolt fastenings 16 are introduced through holes in both the fastening 15 and the carrying arm 14 in order to fasten these at the boss 13. The upper part of each carrying arm 14 is fastened, for example by welding, at the lower part 17 of a bearings house 18. The upper parts 19 of each bearings house 18 are screwed fast by means of bolt fastenings 18a at the lower parts 17. In the cross-sectionally mainly quadratic space between the bearings house parts 17, 19 an elastic pliable rod 20 has been placed in each corner. The bearings house 18 at every disc aggregate 5, 6 is consequently somewhat pliably clamped fast on the beams 21 with mainly quadratic cross-section extending across through the agricultural implement 1.

Along the beams 21, a disc aggregate 5 and 6 with discs 8 is mounted at predetermined distance from each other. A bowed bar 22 is at its one end fastened at each carrying arm 14 in order to regulate the sowing depth or cutting depth of the discs 8.

Each disc 8 is screwed fast at the respective boss 13 by means of four bolts 23, which are preferably evenly distributed in the circumference direction mainly along a circle at a predetermined distance from the centre of the disc. Each boss 13 has a through-running centre hole 24, in which an axle pivot is journalled in bearings, which at 26 is screwed fast at the lower end of the carrying arm 14 (see FIGS. 5 and 6).

The discs 8 are consequently detachably mounted at the boss 13 by means of the bolts 23, which are screwed fast in threaded holes 27 in the outer annular flange 28 of each boss 13. A threaded bolt 29 is screwed fast in a threaded centre hole 30 in the boss 13 on its side facing the disc 8. Between the head 31 of the bolt 29 and the side of the boss 13 facing the disc 8 are arranged a spring washer 32 (next to the boss 13) and a counterholding washer 33. On tightening of the bolt 29 its head 31 presses against the washers 32, 33, which in their turn lock fast a bearings half 34 of a bearing 35 with ballbearings 36. The other bearings half of the bearing is comprised of a profiled part 37 of the centre hole 24 of the boss 13. Through tightening of the bolt 29 the bearing 35 can be tightened in position. A sealing ring 38 is arranged in the centre hole 24 at its side facing the arm 14 in order to prevent soil and other contaminants penetrating in to the bearing 35. For the same reason the bearing 35 is protected on its other side facing the disc 8 by a sealing cap 39, which has an annular flange 40 with a collar 41, which is clicked on over an annular ridge 42 on the boss 3.

Figure 8:
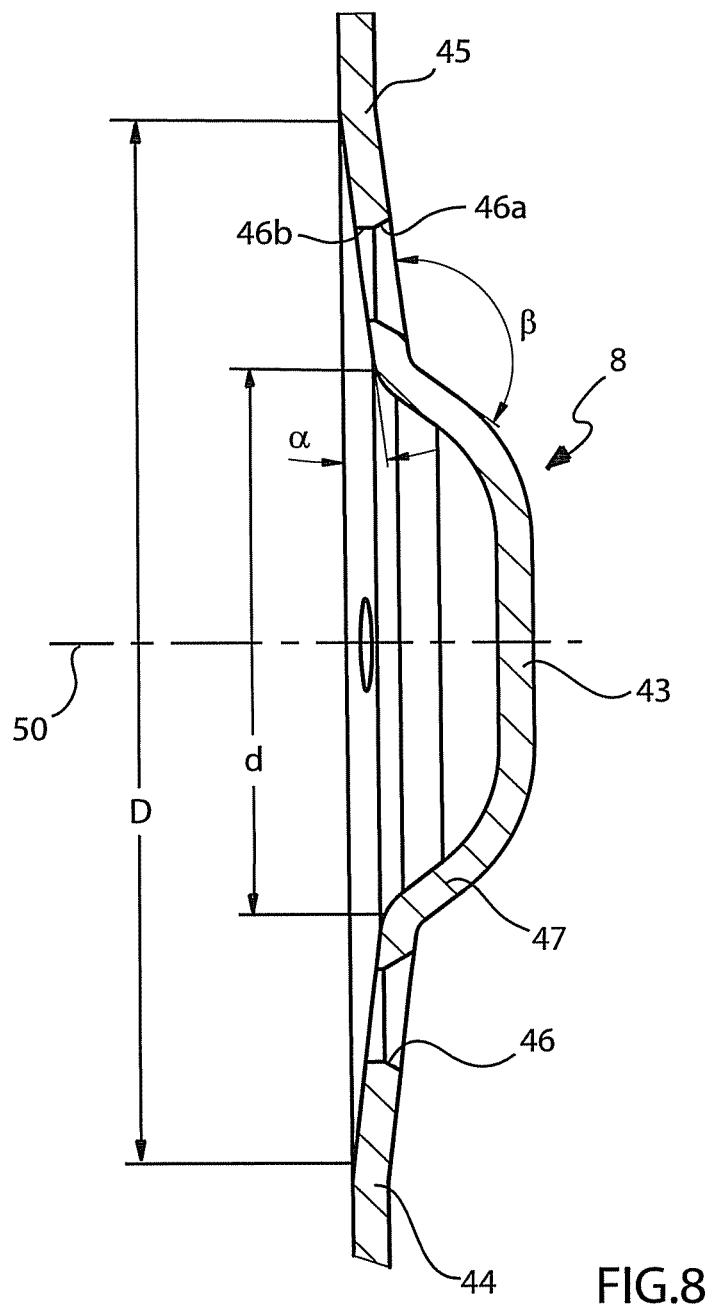
FIG. 8 shows a cross-section of the disc in FIG. 4.

The disc 8 has a central mainly dish-shaped portion 43, which in FIG. 8 is indicated by diameter d. Between the dish-shaped portion 43 and the outer cutting portion 44 of the disc 8 is arranged an annular, mainly truncated conical portion 45, which in FIG. 8 is indicated by the annular section between diameter D and diameter d and in the holes 46 of which the bolts 23 are intended to be introduced during assembly, wherein the holes 46 are preferably evenly distributed in the circumference direction. The annular, mainly truncated conical portion 45 has a mantle surface, which in one embodiment is mainly straight and in another embodiment can be bowed with the convex side facing the centre axis or the boss-receiving, inner side of the disc 8, i.e. to the left and downwards in FIG. 8. In the shown and described embodiment four holes 46 are incised in the annular, mainly truncated conical portion 45 of the disc 8. The annular, mainly truncated conical portion 45 of the disc 8 at the area for the holes 46, or more precisely a line through the opening plane in the hole opening of each fastening bolt hole on the boss-receiving, inner side of the disc 8, is angled inwards at an angle α relative to a plane perpendicular to the centre line of the disc 8. The annular portion 45 is so angled inwards angle α that the inner mantle surface of the annular, mainly truncated conical portion 45 abuts against the thereto adjusted boss 13. The outer mainly planar end surface 47 of the dish-shaped portion 43 forms an angle β in relation to the mantle surface of the annular, mainly truncated conical portion 45. Through this shape is achieved a strong disc 8 in terms of durability where the angled areas existing at different radii and overlapping each other have transitions with appropriate angles so that the risk of fracture indications in the disc 8 is minimised. The word 'angled' above means the line through the opening plane in the hole opening of each fastening screw hole of the disc 8. The side of the boss flange 28 facing the disc 8 is adapted to shape-constrainedly accept the annular, mainly truncated conical portion 45. In order to prevent fracture indications, the transitions between said soil-cultivating portion 44 and said connection portion 45 and also between said connection portion 45 and said central dish-shaped portion 43 are arranged without edges, i.e. curved with a radius.

Figure 5:
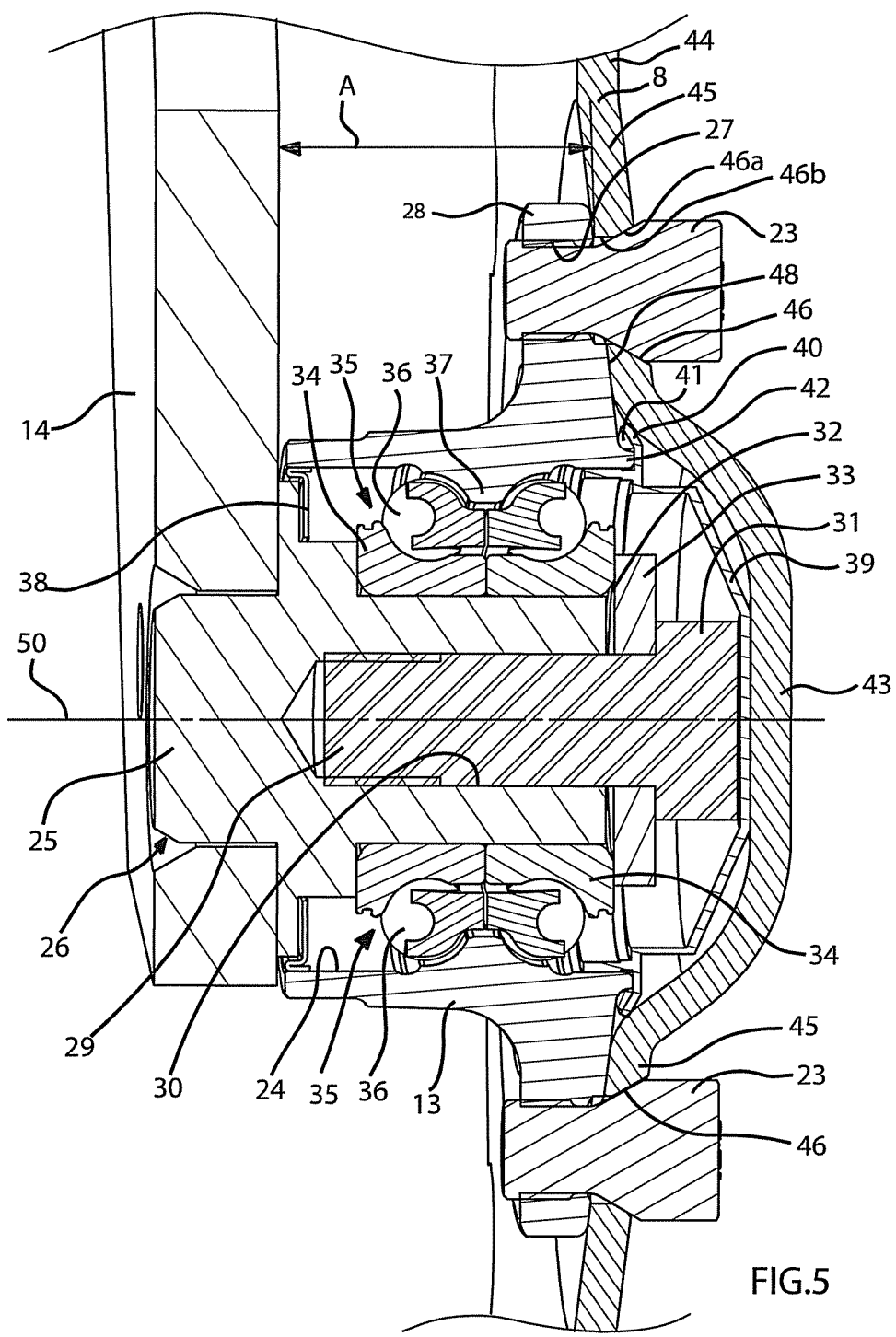
FIG. 5 shows a partial cross-section of the boss with a part of the carrying arm and a part of the disc.

As best seen in FIGS. 5 and 8 the threaded screw holes 27 are mainly parallel to the centre axis 50 and arranged midway in front of the resp. holes 46 in the disc 8. Each hole 46 in the discs 8 consists of a sunken part 46a and a mainly circular cylindrical part 46b. It lies within the concept of the invention that the plane that contains the gradation between the parts 46a and 46b of the hole 46 lies inside the side surfaces of the disc 8, i.e. that part of that plane that lies within the delineation of the hole, extends itself into the material of the disc 8. When this transition, i.e. the interface between the parts 46a and 46b of the hole 46, lies within the periphery of the disc, no fracture indications arise in the vicinity of the hole. Furthermore, it has been possible to arrange no sharp angles but gradual transitions between the central dish-shaped portion 43 and the annular middle portion 45 and also between the annular middle portion 45 and the outer portion 44 of the disc 8. In order to achieve the above it has been shown that a suitable value for the angle α is 5°-10°, preferably 6°-8° and more specifically 7°. It has also been shown suitable that the angle β is 130°-140°, preferably 132°-135° and more specifically 133°. Through this the transitions between said soil cultivating portion 44 and said connection part 45 and also between said connection part 45 and said central dish-shaped portion 43 are comprised of obtuse external angles.

The outer annular surface 48 of the flange 28 of the boss 13 on the side facing the disc 8 is accordingly adapted to the shape of the annular portion 45 of the disc 8, so that its radial extension generally corresponds to the radial extension of the annular portion 45 and preferably extends maximally to the radially viewed outer periphery of the annular portion 45 in order to be able to shape-constrainedly connect the disc 8 to the boss 13.

Figure 6:
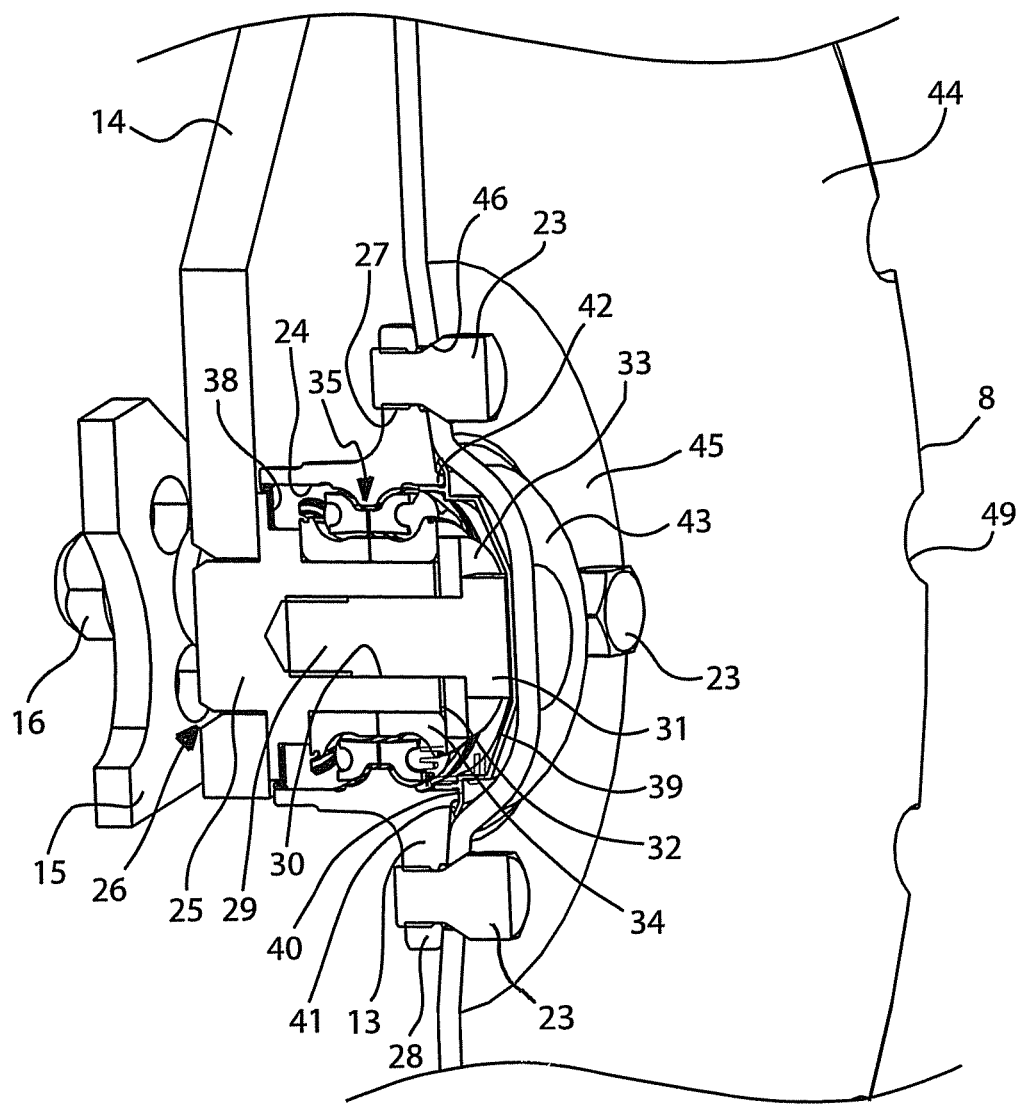
FIG. 6 shows a partial cross-section in the perspective of the disc in FIG. 4.

FIG. 6 shows a partial sectioned perspective view of the boss 13 with mounted-on disc 8. Here it can be seen how the dish-shaped inner portion 43 covers over the sealing cap 39 and that the bolts 23 are evenly distributed radially around the dish-shaped inner portion 43 and in the annular portion 45 of the disc 8.

The shape of the disc 8 as regards the outer annular portion 44 has no influence on the shape of the central portions 43 and 45 and instead it can as mentioned above be shaped planar, conical or in other ways. The notched edge 49 of the disc 8, which is shown in the drawings, is also not limiting for the invention and instead it can have a different shape, such as completely planar.

Figure 7:
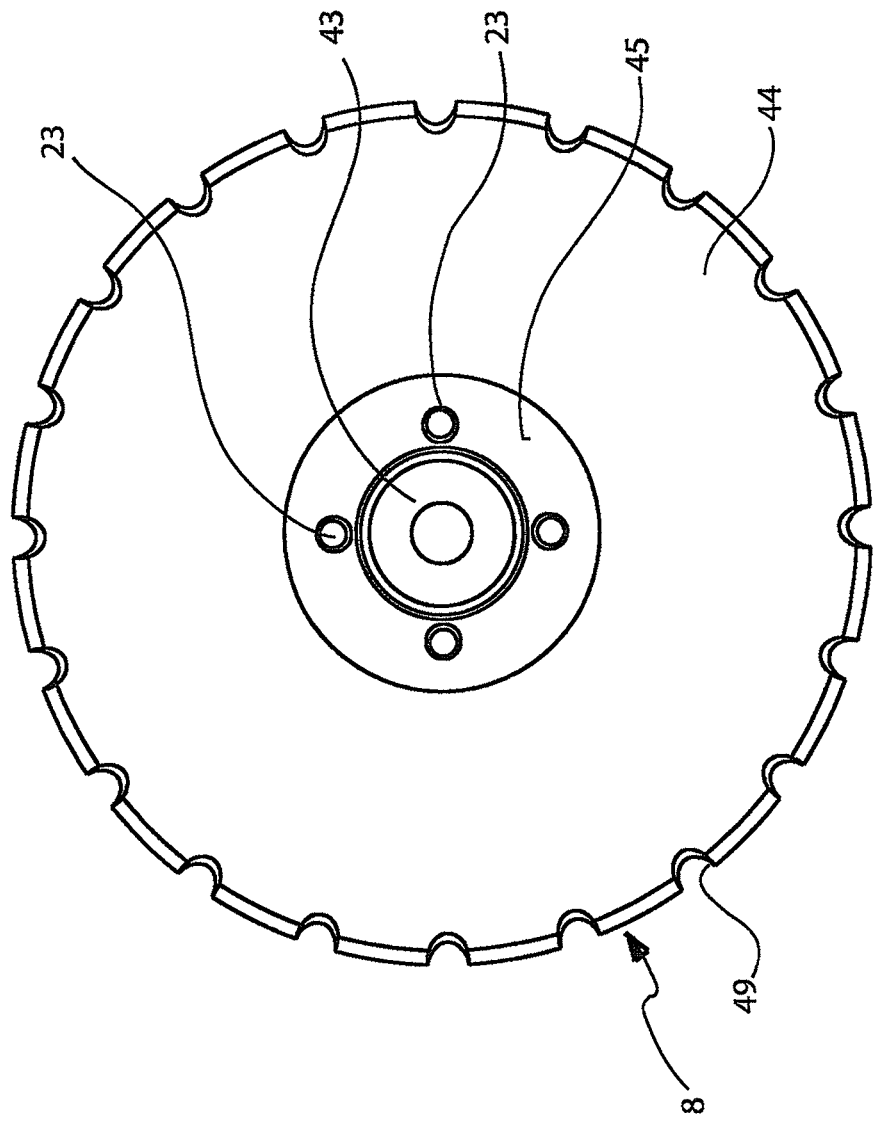
FIG. 7 shows a side view of the disc according to the invention.

It must also be pointed out that the disc 8 has mainly similar thickness along its entire extension. Through the selected angles at the transitions between the portions 43, 44 and 44 of the disc 8, no particular reinforcement needs to be arranged as regards the thickness of any part of the disc 8. The holes 46 in the disc are so designed that they are adapted to the conical part of the bolts 23 between head and threaded shaft. Through the mainly truncated conical portion 44 of the disc 8 being angled at angle α every hole 46 viewed from the side of the disc that is facing away from the boss 13 becomes slightly asymmetrical so that from the outside more material is visible in the sunken part 46a of the hole 46 on the side facing the centre line 50. This is best seen in FIGS. 7 and 8.

The invention can be varied in a plurality of ways within the framework of the attached Claims, for example, as mentioned in the introduction, a different number of holes 27, 46 can be arranged in both boss 13 and disc 8, and the number of holes 46 in the disc 8 could advantageously be three and thereby three threaded holes 27 would also be arranged in the flange 28 of the boss 13 to accept the bolts 23. Regardless of the number of holes they must be evenly distributed in the circumference direction.

The invention claimed is:

1. Disc for an agricultural implement comprising an annular, outside a predetermined centre diameter (D) defined, soil-cultivating portion, a central, inside a predetermined centre diameter (d) defined, dish-shaped portion, with a boss-receiving, inner side and between these portions an existing, a connection portion with fastening screw holes, which are designed to accept fastening screws parallel with a disc centre line of said disc and parallel to each fastening screw, wherein said connection portion is a truncated conical portion and that a line parallelly through the opening plane in the hole opening of each fastening screw hole on said inner side forms an angle (α) with a plane that is perpendicular to the disc centre line, wherein said angle (α) is 5°-10°, and
whereby transitions between said soil-cultivating portion and said connection portion and between said connection portion and said central dish-shaped portion are arranged without edges and are comprised of obtuse external angles,
each fastening screw hole in the connection portion of the disc has a sunken part,
the truncated conical portion has an angled opening relative to the sunken part to accept a head of each fastening screw,
said angled opening is flush with an outer surface of the truncated conical portion,
the truncated conical portion has a surface,
the connection portion is angled inward towards the dish-shaped portion by said angle (α) where an inner surface of the truncated conical portion abuts against a boss, and
an outer end surface of the dish-shaped portion forms an additional angle (β) in relation to the surface of the truncated conical portion.

2. Disc according to claim 1, wherein said angle (α) is 6°-8°, preferably 7°.

3. Disc according to claim 1, wherein each fastening screw hole in the connection portion of the disc has the sunken part and a mainly circular cylindrical part and that the interface between these parts lies within the periphery of the disc.

4. Disc according to claim 1, wherein said line through the opening plane on the inner side of the disc forms the additional angle (β) with a mainly planar end section of said dish-shaped portion, wherein said additional angle (β) is 130°-140°.

5. Disc according to claim 4, wherein said additional angle (β) is 132°-135°, preferably 133°.

6. Disc according to claim 1, wherein the transitions between said soil cultivating portion and said connection portion and also between the connection portion and said dish-shaped portion are bowed and have a radius.

7. Disc according to claim 1, wherein the disc has a mainly similar thickness along its entire extension.

8. Disc aggregate comprising a tool arm with the boss, which is adapted to shape-constrainedly accept a disc according to claim 1.

9. Agricultural implement with a predetermined number of disc aggregates, which each comprise a tool arm with the boss, which is adapted to shape-constrainedly accept a disc according to claim 1.

10. Disc according to claim 2, wherein each fastening screw hole in the connection portion of the disc has the sunken part and a mainly circular cylindrical part and that the interface between these parts lies within the periphery of the disc.

11. Disc according to claim 2, wherein said line through the opening plane on the inner side of the disc forms the additional angle (β) with a mainly planar end section of said dish-shaped portion, wherein said additional angle (β) is 130°-140°.

12. Disc according to claim 3, wherein said line through the opening plane on the inner side of the disc forms the additional angle (β) with a mainly planar end section of said dish-shaped portion, wherein said additional angle (β) is 130°-140°.

13. Disc according to claim 2, wherein the transitions between said soil cultivating portion and said connection portion and also between the connection portion and said dish-shaped portion are bowed and have a radius.

14. Disc according to claim 3, wherein the transitions between said soil cultivating portion and said connection portion and also between the connection portion and said dish-shaped portion are bowed and have a radius.

15. Disc according to claim 4, wherein the transitions between said soil cultivating portion and said connection portion and also between the connection portion and said dish-shaped portion are bowed and have a radius.

16. Disc according to claim 5, wherein the transitions between said soil cultivating portion and said connection portion and also between the connection portion and said dish-shaped portion are bowed and have a radius.

17. Disc according to claim 2, wherein the disc has a mainly similar thickness along its entire extension.

18. Disc according to claim 3, wherein the disc has a mainly similar thickness along its entire extension.

19. Disc according to claim 4, wherein the disc has a mainly similar thickness along its entire extension.

20. Disc according to claim 5, wherein the disc has a mainly similar thickness along its entire extension.

* * * * *